No. 643,877. Patented Feb. 20, 1900.
C. LORENZEN.
PROTECTOR AGAINST STEAM FROM KETTLES.
(Application filed Sept. 21, 1899.)
(No Model.)
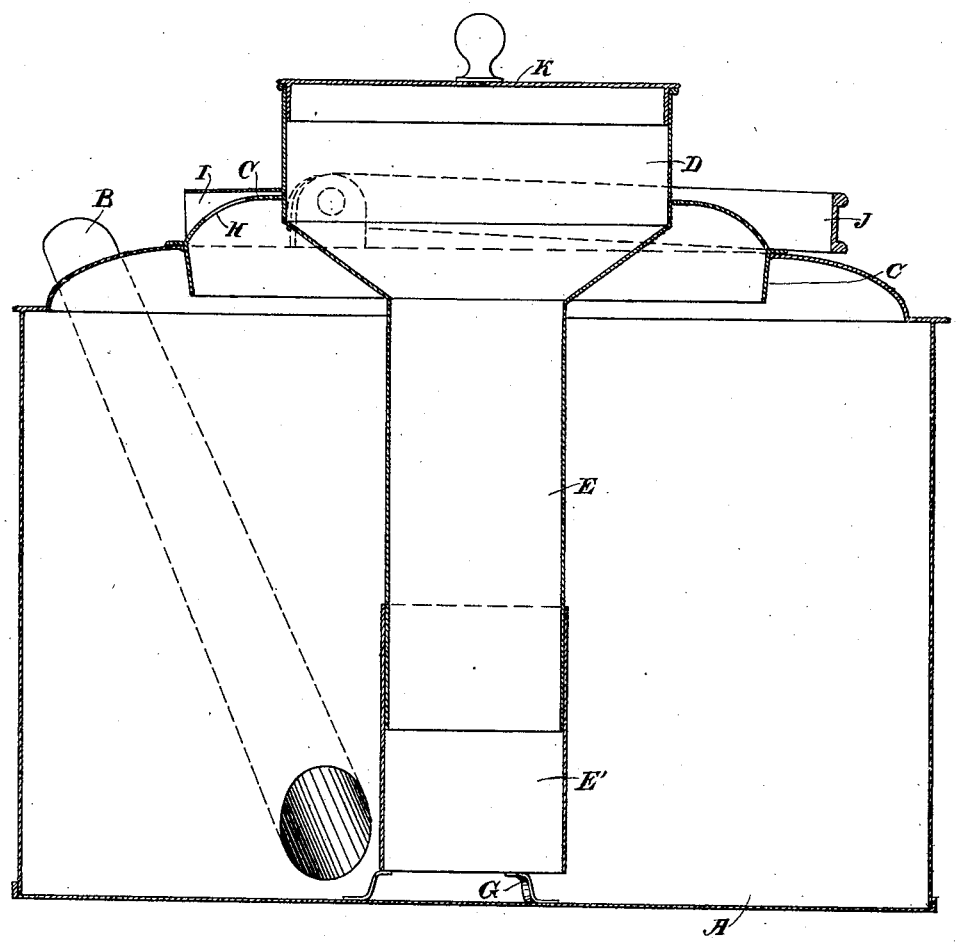
Witnesses,
Inventor,
Coby Lorenzen
By Dewey Strong & Co
Attys

UNITED STATES PATENT OFFICE.

COBY LORENZEN, OF OAKLAND, CALIFORNIA.

PROTECTOR AGAINST STEAM FROM KETTLES.

SPECIFICATION forming part of Letters Patent No. 643,877, dated February 20, 1900.

Application filed September 21, 1899. Serial No. 731,167. (No model.)

*To all whom it may concern:*

Be it known that I, COBY LORENZEN, a citizen of the United States, residing in Oakland, county of Alameda, State of California, have invented an Improvement in Protectors Against Steam from Kettles; and I hereby declare the following to be a full, clear, and exact description of the same.

My invention relates to an attachment for kettles and culinary utensils adapted to serve as a cover for such vessels and as a means for protecting users against injury by steam arising from the vessels.

The invention consists of the parts and the construction and combination of parts forming the aforesaid attachment, as I will hereinafter describe and claim.

The figure is a sectional elevation showing my invention as applied to a tea-kettle.

When vessels, such as tea-kettles, which are used to boil water and for like purposes have to be again filled with water, it is necessary to remove the cover from the top, and this allows a volume of hot steam to escape which is dangerous to the operator. My invention is designed to protect the user from this steam and to provide for the filling of the kettle without allowing this body of steam to escape in such a manner as to injure the user.

A is the body of a kettle or like utensil designed for the purpose of boiling water upon the stove or range and for any use to which it may be applied.

In the present case I have shown my invention as applied to a tea-kettle having the pouring-spout B and cover C, this cover fitting a large central opening in the top of the kettle.

In my invention I have made an opening of considerable size in the top of the cover and have fitted into it a funnel-shaped extension D, into which water may be poured without removing the cover from the kettle. From the bottom of this extension or receiver D a tube E extends to a point near the bottom of the kettle when the cover is in place. As kettles of this class may vary in depth without having any great variation in the cover-opening, I have shown the tube E as having an extensible sleeve E' slidable with relation to it, so that it may be lengthened or shortened to suit different depths of kettles, and I have also shown supporting legs or feet G projecting below the bottom of the tube or its extension to rest upon the bottom of the kettle, and thus maintain the lower end of the tube at all times at the desired distance above the bottom of the kettle. An opening H is made through the cover exterior to the funnel or receiver D and is connected with a hood or passage I, by which the steam escaping from the boiling water within the kettle is directed to one side and not allowed to rise into line with the handle J, which in these kettles are always across the center and above the cover. A second cover K is adapted to fit the funnel or open top of the main cover when the kettle is in use. If it is desired to refill the kettle while it is boiling, it is only necessary to remove this secondary cover, when water can be poured into the funnel or receiver D and will flow down through the central tube to the bottom, flowing outwardly and filling up the kettle. By reason of the small diameter of the tube and the fact that its open lower end is close to the bottom of the kettle no appreciable amount of steam will escape through it, and the user can safely carry the kettle by its handle without danger of being burned. During ebullition or at any time the amount of steam arising within the kettle will be discharged through the passage and opening provided for the purpose.

The device is safe and useful.

Having thus described my invention, what I claim as new, and desire to secure by Letters Patent, is—

1. An attachment for a kettle and other culinary vessel consisting of a flanged cover adapted to be seated in the top opening of said vessel and formed rigid with a receiver provided with a supplemental removable cover, said receiver having a tubular extension from its lower end adapted to project to a point near the bottom of the vessel and said cover having a steam-discharge at one side protected by an inclosing hood.

2. An attachment for a kettle or other culinary vessel, consisting of a flanged cover formed rigid with a central funnel-shaped receiver, a supplemental cover for the receiver, a tubular extension from the lower end of the receiver, an extensible sleeve carried by the lower extension and provided with means for maintaining its lower edge out of contact with the vessel, whereby the attachment is adapted for use with vessels of varying depths and an open communication is maintained between the sleeve and the interior of said vessel, said cover having a steam-outlet at one side of the receiver and a hood overhanging said outlet.

In witness whereof I have hereunto set my hand.

COBY LORENZEN.

Witnesses:
S. H. NOURSE,
GEO. H. STRONG.